Patented Sept. 16, 1924.                                              1,508,417

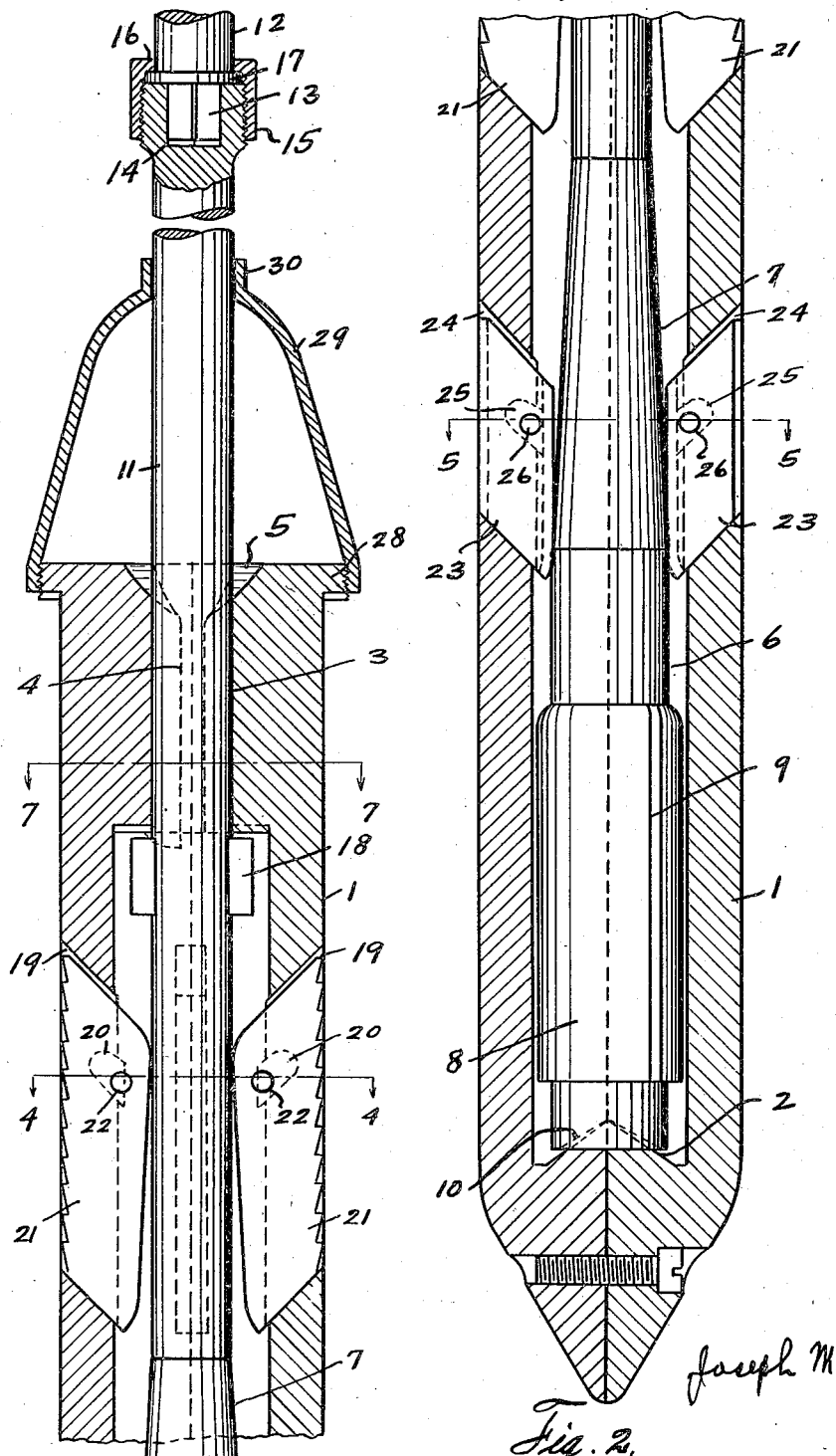

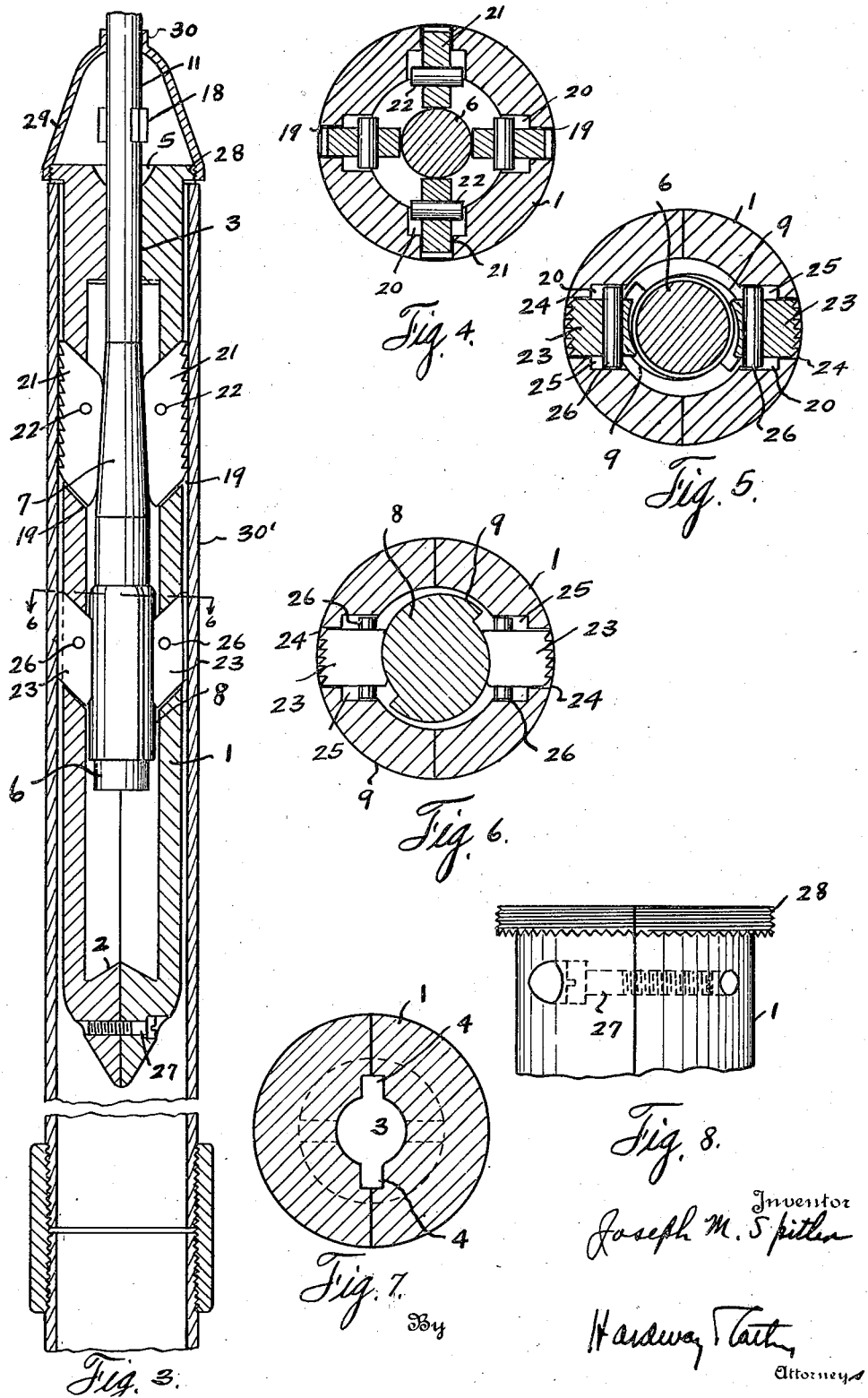

UNITED STATES PATENT OFFICE.

JOSEPH M. SPITLER, OF HOUSTON, TEXAS.

PIPE-RECOVERING DEVICE.

Application filed May 2, 1924. Serial No. 710,487.

*To all whom it may concern:*

Be it known that I, JOSEPH M. SPITLER, a citizen of the United States, residing at Houston, in the county of Harris and State of Texas, have invented certain new and useful Improvements in a Pipe-Recovering Device, of which the following is a specification.

This invention relates to new and useful improvements in a pipe recovering device.

One object of the invention is to provide a device of the character described specially designed for use in recovering pipe stuck in a well bore, and so constructed that it may be utilized in withdrawing the pipe either by a direct pull, or by rotating the pipe to unscrew the sections thereof so that they may be withdrawn one at a time, in case the pipe cannot be dislodged by a direct pull.

Another object of the invention is to provide a pipe recovering device which may be readily released from the pipe and withdrawn, in case the pipe cannot be recovered.

With the above and other objects in view this invention has particular relation to certain novel features of construction, operation, and arrangement of parts, an example of which is given in this specification and illustrated in the accompanying drawings, wherein:—

Figures 1 and 2 show vertical sectional views, respectively, of the upper and lower ends of the device, in non-pipe-engaging position.

Figure 3 shows a vertical sectional view thereof in pipe engaging position.

Figure 4 shows a transverse sectional view on the line 4—4 of Figure 1.

Figure 5 shows a transverse sectional view on the line 5—5 of Figure 2.

Figure 6 shows a transverse sectional view taken on the line 6—6 of Figure 3.

Figure 7 shows a transverse sectional view taken on the line 7—7 of Figure 1; and, Figure 8 shows an enlarged side view of the upper end of the device, with the hood removed.

Referring now more particularly to the drawings, wherein like numerals of reference designate similar parts in each of the figures, the numeral 1 designates the body of the implement which is substantially tubular in form with its lower end closed and tapered, or pointed, so as to readily enter the upper end of the pipe to be pulled. Within said closed lower end there is a substantially conical shaped bearing 2, for a purpose hereinafter to be explained. The upper end of the body has a reduced bearing 3 formed with vertical side slots 4, 4, whose upper ends are flared as at 5.

Within the body there is a mandrel 6 having a downwardly flared section 7, and beneath it the enlarged section 8, formed with oppositely disposed, correspondingly inclined cam faces 9, 9. The lower end of the mandrel has a recess 10 to receive the bearing 2 on which said mandrel, at times, rotates. The shank 11, of the mandrel, works through the bearing 3 and to the upper end of this shank the operating stem, or rod, 12 is attached. This connection is preferably made by means of a square pin 13 carried by the lower end of the stem, which fits into a correspondingly shaped socket 14 in the upper end of the shank, and which is held therein by means of a clamp nut 15, which is screwed on said shank and has an inwardly extending flange 16 which engages with an end flange 17, on the lower end of said rod. The shank 11, of the mandrel, has a cross key 18 therethrough whose projecting ends are adapted to work through the grooves 4, 4, as the mandrel is moved up or down relative to the barrel.

The body 1 has a plurality of radial slots 19, cut therethrough, said slots having inwardly declining side bearings 20, 20. In these slots there are the pipe engaging jaws 21 having the lateral bearing pins 22, 22, which ride in the corresponding bearings 20, 20. The outer edges of the jaws are serrated, forming pipe engaging teeth, and said jaws are normally held, by gravity, in inward or non-engaging position by reason of the inward declination of the bearings 20, as well as the similar declination of the lower ends of the slots 19, on which the lower ends of said jaws also rest.

Beneath the jaws 19 there are the pipe rotating jaws 23, 23, which work through the radial slots 24, 24, cut through the body, and provided with inwardly declining side slots forming bearings 25, 25, in which the lateral bearing pins 26, 26, carried by the jaws 23, work. The outer edges of the jaws 23 are toothed to engage with the pipe to be pulled when the mandrel is rotated.

The body 1 is preferably formed of two longitutinal sections secured together by screws as 27, for convenience in manufacture, and the upper end of this body has an annular flange 28, which is outwardly threaded to receive the housing 29, which is threaded thereon, and has a bearing 30 through which the shank of the mandrel works. This housing secures the body sections together, as well as protects the working parts of the apparatus from dirt, grit and the like. The underside of the flange 28 is serrated for a purpose to be hereinafter stated.

In operation the device is lowered, through the stem 12, into the pipe 30', to be pulled until the flange 28 contacts with the upper end of said pipe and stops the downward movement of the body. The mandrel will move on downwardly, relative to the body until it seats on the bearing 2. During this downward movement of the mandrel the key 18 will pass along the slots 4, said mandrel being turned, if necessary, to align said key with said slots, and the upper ends of the slots being flared to facilitate the entrance of the key. In this position the flared portion 7 of the mandrel is beneath the pulling jaws 21 and the cams 9 are beneath the rotating jaws 23. An upward pull on the stem 12 will cause the flared section of the mandrel to wedge between the jaws 21 and force them out into engagement with the pipe and a continued upward pull often will be effective to dislodge the pipe. If the pipe cannot be thus pulled the stem is now rotated backwardly, or in a left hand direction and the cams 9 will operate to spread, or expand, the jaws 23 into engagement with the pipe and the upper section of the pipe may be unscrewed and thus recovered, and by repeating the operation the pipe may be removed a section at a time. In unscrewing these sections the engagement of the teeth of the flange 28 with the upper end of the pipe assist materially in the operation.

If the pipe cannot be dislodged by either method above detailed the mandrel may be lowered to carry the key 18 beneath the bearing 3 and the mandrel turned to carry said key out of alignment with the slots 4, and the stem then pulled upwardly to engage the key against the upper end of the body 1, and the entire apparatus then withdrawn from the bore.

What I claim is:—

1. A pipe puller including a tubular jaw carrier, a mandrel therein, provided with a flared portion, and cams, radially movable jaws mounted in the carrier, some of said jaws being adapted to be expanded by said flared portion, and the other of said jaws being adapted to be expanded by said cams.

2. A pipe puller including a tubular jaw carrier, a mandrel therein provided with a flared portion, cams on said mandrel, pipe engaging jaws radially movable in said carrier and adapted to be expanded by said flared portion when the mandrel is moved longitudinally in the carrier and adapted to be expanded by the cams when said mandrel is rotated relative to the carrier.

3. A pipe puller including a tubular jaw carrier, a mandrel therein provided with a flared portion, cams on said mandrel, pipe engaging jaws radially movable in said carrier and adapted to be expanded by said flared portion when the mandrel is moved longitudinally in the carrier and adapted to be expanded by the cams when said mandrel is rotated relative to the carrier, and means for locking the mandrel against longitudinal movement relative to the carrier.

4. A pipe puller including a tubular jaw carrier, a mandrel therein provided with a flared portion, cams on said mandrel, pipe engaging jaws radially movable in said carrier and adapted to be expanded by said flared portion when the mandrel is moved longitudinally in the carrier and adapted to be expanded by the cams when said mandrel is rotated relative to the carrier, means for locking the mandrel to the carrier out of operative contact with said jaws.

5. A pipe puller including a jaw carrier, a mandrel longitudinally movable therein and formed with a flared jaw expander, and a cam shaped jaw expander, means for locking said mandrel relative to the carrier, in inactive position, pipe pulling jaws, and pipe rotating jaws radially movable in the carrier, said flared expander being adapted to expand the pipe pulling jaws when moved into contact therewith, and said cam shaped expander being adapted to expand the pipe rotating jaws when the mandrel is rotated relative to the carrier.

In testimony whereof I have signed my name to this specification in the presence of a subscribing witness.

JOSEPH M. SPITLER.

Witness:
JOHN WM. PALMER.